(12) United States Patent
Köhler et al.

(10) Patent No.: US 10,433,502 B2
(45) Date of Patent: Oct. 8, 2019

(54) SPRINKLER CONTROL SYSTEM

(71) Applicant: HUSQVARNA AB, Huskvarna (SE)

(72) Inventors: Moritz Köhler, Zürich (CH); Philipp Bolliger, Winterthur (CH)

(73) Assignee: HUSQVARNA AB, Huskvarna (SE)

( * ) Notice: Subject to any disclaimer, the term of this patent is extended or adjusted under 35 U.S.C. 154(b) by 198 days.

(21) Appl. No.: 14/916,239

(22) PCT Filed: Sep. 3, 2014

(86) PCT No.: PCT/EP2014/068764
§ 371 (c)(1),
(2) Date: Mar. 3, 2016

(87) PCT Pub. No.: WO2015/032834
PCT Pub. Date: Mar. 12, 2015

(65) Prior Publication Data
US 2016/0219807 A1   Aug. 4, 2016

(30) Foreign Application Priority Data
Sep. 6, 2013 (DE) .................. 10 2013 109 784

(51) Int. Cl.
*G05D 11/00* (2006.01)
*A01G 25/16* (2006.01)
*G05B 19/042* (2006.01)

(52) U.S. Cl.
CPC ....... *A01G 25/167* (2013.01); *G05B 19/0426* (2013.01); *G05B 2219/23406* (2013.01); *G05B 2219/25067* (2013.01); *G05B 2219/2625* (2013.01); *Y02A 40/238* (2018.01)

(58) Field of Classification Search
CPC .............. A01G 25/167; G05B 19/0426; G05B 2219/23406; G05B 2219/25067
USPC .......... 702/284, 282, 283; 239/69, 240, 200, 239/237; 700/284, 282, 283
See application file for complete search history.

(56) References Cited

U.S. PATENT DOCUMENTS

| | | | |
|---|---|---|---|
| 5,246,164 A | 9/1993 | McCann et al. | |
| 7,051,952 B2 * | 5/2006 | Drechsel | A01G 25/09 239/230 |
| 7,590,471 B2 * | 9/2009 | Jacobsen | A01G 25/16 137/485 |
| 2002/0125338 A1 * | 9/2002 | Collins | B05B 3/02 239/69 |

(Continued)

FOREIGN PATENT DOCUMENTS

| CN | 2074984 U | 4/1991 |
|---|---|---|
| CN | 1515147 A | 7/2004 |

(Continued)

OTHER PUBLICATIONS

International Search Report and Written Opinion of PCT/EP2014/068764 dated Nov. 10, 2014.

(Continued)

*Primary Examiner* — Vu A Le
(74) *Attorney, Agent, or Firm* — Burr & Forman LLP (57) ABSTRACT

The invention relates to a sprinkler control system (10) for controlling at least one sprinkler (12). A program system (14) which determines a sprinkler area (16) of the sprinkler (12) using an area chart (18) is provided.

19 Claims, 6 Drawing Sheets

(56) References Cited

U.S. PATENT DOCUMENTS

| | | | | |
|---|---|---|---|---|
| 2009/0326723 | A1* | 12/2009 | Moore | A01G 25/16 700/284 |
| 2012/0018532 | A1 | 1/2012 | Nelson et al. | |
| 2012/0090232 | A1 | 4/2012 | Mittelmark et al. | |
| 2013/0116836 | A1 | 5/2013 | Abts et al. | |

FOREIGN PATENT DOCUMENTS

| | | |
|---|---|---|
| CN | 2755961 Y | 2/2006 |
| CN | 101569280 A | 11/2009 |
| DE | 102005058798 A1 | 6/2007 |
| JP | H03206822 A | 9/1991 |
| RU | 2112361 C1 | 6/1998 |
| RU | 2010128997 A | 1/2012 |
| WO | 2006060465 A2 | 6/2006 |

OTHER PUBLICATIONS

International Preliminary Report on Patentability of PCT/EP2014/068764 dated Mar. 8, 2016.

\* cited by examiner

SPRINKLER CONTROL SYSTEM

PRIOR ART

The invention relates to a sprinkling control system for controlling at least one sprinkler. A sprinkler device with a sprinkler with a sprinkler control system is known from DE 10 2005 058 798 A1. The sprinkler control system has a control device with a programmable memory in which a user programs in a control value corresponding to a respectively associated range in order to establish a sprinkling area for a plurality of angle settings of a nozzle arrangement. Additional control values are interpolated by the control device. The control values are determined by the user by "trial and error". The method is time-consuming, and a substantial risk exists of areas outside of the sprinkling area being irrigated inadvertently.

A sprinkler device with a sprinkler with a sprinkler control system is known from US 2012/018532. The sprinkling control system comprises a programming system that is provided for the purpose of establishing at least one sprinkling area of the sprinkler manually with the aid of a zone map.

A sprinkler device with a sprinkler with a sprinkler control system is also known from DE 10 2005 058798 A1. The sprinkling control system comprises a programming system that is provided for the purpose of establishing at least one sprinkling area of the sprinkler manually with the aid of a zone map.

The object of the invention consists particularly in providing a sprinkling control system for controlling at least one sprinkler with improved characteristics with regard to the establishing of the sprinkling area of the sprinkler. The object is achieved according to the invention by the features of claim 1, with advantageous embodiments and developments of the invention following from the subclaims.

ADVANTAGES OF THE INVENTION

The invention involves a sprinkling control system for controlling at least one sprinkler.

A programming system is proposed that is provided for the purpose of establishing at least one sprinkling area of the sprinkler with the aid of a map of the area, the programming system being provided for the purpose of transforming geometric data of the zone map into sprinkling control parameters of the control device of the sprinkler.

A "sprinkler" is understood in this context particularly as being a device for sprinkling an area, such as agricultural land, but particularly of a park and/or a garden area, with a liquid, particularly water. The area can be used for the cultivation of plants and/or recreational and/or leisure activities of users of the areas. The area can be part of a public garden or park. Preferably, the area is part of a private garden. The area can surround, in whole or in part, a building such as a public building, a hotel and/or a hospital, or preferably a residential building. The area can also be part of a building, such as, particularly, a roof garden or a terrace. The area can also be part of a golf course or a similar useful area. In this context, "user" refers particularly to a person who are present in the vicinity of the area to be sprinkled by the sprinkler. What is more, animals, particularly domestic animals present in the garden, can also be users of the area. Preferably, the sprinkler has nozzles through which liquid streams can be directed onto the area. Various types of sprinkler are known, particularly oscillating sprinklers with a nozzle arrangement that can swivel in an oscillating manner about a horizontal axis, and rotary or sector sprinklers with a nozzle arrangement that can rotate about a vertical axis. Other types of sprinkler are conceivable, particularly sprinklers with a nozzle arrangement that extends on a convex, particularly semicircular surface. A "sprinkling area" is to be understood in this context as an area that is to be sprinkled by the sprinkler. Preferably, the sprinkler has means with which the shape of the sprinkling area can be adjusted and/or influenced. In particular, an actuating movement in which the nozzle arrangement can be moved can be adjustable and/or influenceable. Moreover, a liquid pressure acting on the nozzles can be adjustable and/or influenceable for all and/or single nozzles. Preferably, the sprinkler can be embodied such that, when controlled with suitable sprinkling control parameters, it can sprinkle a freely definable sprinkling area which, starting from a position of the sprinkler, lies within a maximum stream range of the sprinkler defining a maximum area of movement of the sprinkler. In this context, a "zone map" is intended to be understood particularly as a map that has a garden with activity areas. The zone map can include the boundaries and topography of an area. The activity areas can particularly include sprinkling zones. A "sprinkling zone" is to be understood in this context particularly as an area of the garden that is to be watered by sprinkling. If a sprinkling zone is sprinkled by a sprinkler, it can be identical to the sprinkling area of the sprinkler. It is also possible, however, for a sprinkling zone to be sprinkled by several sprinklers and to contain at least parts of several sprinkling areas.

It is also possible for a sprinkler to sprinkle several sprinkling zones and for its sprinkling area to contain all or part of several sprinkling zones. In particular, the zone map has contours of at least one sprinkling zone. A "programming system" is to be understood in this context particularly as a system that is provided for the purpose of preparing information of the zone map and other information such that it is suitable for establishing the sprinkling area of the sprinkler. The programming system can particularly have mechanical and preferably electrical and/or electronic control, data processing and memory units. The programming system can be integrated at least partially into the sprinkler. The sprinkling area of the sprinkler and the sprinkling zone can advantageously be established with the aid of the zone map. Tedious programming of the sprinkling control system by the user can be omitted. Inadvertent irrigation of zones outside of the sprinkling zones can be avoided.

It is proposed that the programming system have at least one programming unit provided for the purpose of conveying sprinkling control parameters to a control device of the sprinkler. "Control device of the sprinkler" is to be understood in this context particularly as a device of the sprinkler that is provided for the purpose of influencing the stream range and/or a stream direction of the streams emerging from the nozzles of the sprinkler. The control device can particularly have drives and/or control valves as well as means for setting conveyed sprinkling control parameters. The programming unit can particularly be provided for the purpose of conveying a sequence of sprinkling control parameters to the control unit during a sprinkling operation in order to achieve irrigation of the desired sprinkling area. The programming unit advantageously has a parameter memory. The programming unit can advantageously be provided for the purpose of independently controlling, in one operating mode, the irrigation of the sprinkling area with the aid of the information stored in the parameter memory. The sprinkler can be used independently with the programming unit. It is also possible for the control unit to have a memory unit for storing the sequence of sprinkling control parameters for a sprinkling operation.

In this case, the programming unit can advantageously convey the sequence of sprinkling control parameters to the control unit and the control unit can independently control a sprinkling operation. The programming unit can be connected to the control unit of the sprinkler by means of a data link in order to transmit sprinkling control parameters. Especially preferably, the programming unit can be part of the sprinkler and particularly be arranged in a common housing with the sprinkler. The programming unit can be provided for the purpose of determining the sprinkling control parameters that are suitable for the sprinkler with the aid of geometric data sent to the programming unit. The geometric data can particularly have been determined with the aid of the zone map and describe the absolute coordinates of sprinkling zones and/or the sprinkling area. In this context, "absolute coordinates" are particularly to be understood as being coordinates represented in a coordinate system that is independent from sprinkler models and/or sprinkler positions, particularly coordinates in a Cartesian coordinate system. "Sprinkler position" is intended to refer in this context particularly to a place and an orientation of a sprinkler with respect to the zone map. In particular, the geometric data can be independent of the type of sprinkling control parameter that is suitable for the sprinkler and/or of the sprinkler model. Preferably, if there are several sprinklers, each sprinkler has a programming unit adapted to the sprinkler model and/or the programming unit can be adapted to the sprinkler model.

Components of the sprinkling control system that are superordinate to the programming unit can determine the geometric data independently of the design of the sprinkler. In another, advantageous embodiment of the invention, components of the sprinkling control system that are superordinate to the programming unit can have sprinkler models, particularly of rotary sprinklers and/or oscillating sprinklers, in order to determine relative coordinates from the geometric data and/or sprinkling areas and convey them to the programming unit. In this context, the term "relative coordinates" is intended particularly to refer to coordinates represented in a coordinate system that is specifically for a sprinkler model and/or in which a sprinkler position within a zone map is taken into account. In particular, the coordinates can have actuating variables of the sprinkler for sprinkling the sprinkling area, such as angular positions and/or settings of control valves. The programming unit can have an especially simple construction.

Transformations of superordinate, absolute coordinates to sprinkler-specific relative coordinates can take place on a system that is superordinate to the programming unit.

Moreover, it is proposed that the programming system have a programming device for defining sprinkling zones and/or sprinkling areas. A "programming device" is to be understood in this context particularly as a device that is provided for the purpose of defining sprinkling zones and/or sprinkling areas in an interaction with the user. Preferably, the programming device is embodied as a device that can be carried by the user. Preferably, the programming device has a particularly wireless data link to the programming unit. Especially preferably, the programming unit and/or the programming system can have a wireless, internet-based data link. The programming device can preferably be embodied as a smartphone and/or, especially preferably, as a tablet computer with a programming software that provides the functions required for the programming system. Preferably, the programming device has a graphical display, particularly a screen. Preferably, the programming device provides the user with a graphical representation of the zone map, sprinkling areas and sprinkling zones and sprinkler positions. Preferably, the programming device has input means, particularly a touchscreen, for user inputs. Especially preferably, the user can graphically mark sprinkling zones and/or sprinkler positions on the zone map with the aid of the touchscreen. Preferably, the programming device can display on the zone map the maximum possible sprinkling areas as a function of sprinkler positions and sprinkler model. The programming device can preferably receive from an external system, particularly a map server, via an internet connection. Preferably, the programming device can have additional means for determining the zone map and/or the sprinkling zones and/or the sprinkler positions, such as, in particular, a compass and/or movement and/or acceleration sensors and/or a positioning system, such as a positioning system based on laser range finders, for example, and/or a GPS receiver or another radio-supported positioning system. Preferably, the positioning device can have software that is provided for the purpose of determining zone maps and/or sprinkling zones and/or sprinkler positions with the aid of camera images, and/or of supplementing zone maps with features with the aid of camera images. In addition and/or alternatively, 3D cameras, laser surveying instruments or other devices that a person skilled in the art deems suitable can be used to generate and/or supplement zone maps. Preferably, the programming device can be provided for the purpose of determining locations of the camera images using the positioning system of the programming device. Preferably, the programming device can be provided for the purpose of determining sprinkling zones and sprinkler positions using camera images and/or video recordings and/or by following a path. In particular, the user can move the programming device with the camera function and/or positioning function activated along a boundary of a sprinkling zone to be defined. The programming device can follow the path of movement, link it to the zone map and, in this way, determine the sprinkling zone within the zone map. It is also possible for the zone map to be prepared on the basis of the path of movement. The sprinkling zones and/or sprinkling areas can be defined with particular ease. The surveying of the sprinkling zones using other means can be omitted. The definition of the sprinkling zones can be independent of the characteristics and type of sprinkler. Defined sprinkling zones can be used to control different sprinklers. Irrigation of zones outside of sprinkling zones can be prevented while defining sprinkling zones. Preferably, the sprinklers have at least one positioning means which is provided for the purpose of aligning the programming device in a defined position and/or orientation with respect to the sprinkler. The positioning means can particularly be formed by one or more recesses and/or stops that are preferably suitable for positive positional transfer. The programming device can advantageously determine the sprinkler position on the basis of its own position known by means of the positioning functions of the programming device.

Especially advantageously, the programming system has a zone server that is linked to a programming unit and/or the programming device in at least one operating state. In this context, a "zone server" is to be understood particularly as a server that is provided for the purpose of administrating zones within a zone map and/or coordinating activities within the zones and/or storing information about the zones. The zones can be sprinkling zones or even zones of another type, such as mowing zones that are to be mowed by a lawnmower, or also fertilizing zones, irrigation zones, lighting zones and other zones deemed sensible by a person skilled in the art.

The zones can overlap, so that one area of the zone map can be associated with several zones and/or zone types. For example, all or part of a sprinkling zone can also be a mowing zone. The zone server can advantageously be an internet-based server. The zone server can very easily exchange data with the programming unit, the programming device, the user and/or other, internet-based services such as, particularly, map servers, calendar services and/or weather services. The zone server can advantageously provide information for controlling the sprinkler, particularly a weather report, and/or calendar information can be used to determine an optimum sprinkling time and/or an optimum sprinkling quantity. Preferably, the zone server can use information from an external expert system to determine sprinkling times and/or sprinkling quantities, and/or the zone server itself can have an expert system. In this context, an "expert system" is to be understood particularly as a system that links information with stored data, models and algorithms and evaluates them. In particular, the expert system can have a database with locations and types of plant as well as plant models that describe the expected development of different as a function of environmental parameters such as temperature, humidity, lighting, nutrient content and wind, as well as care algorithms that describe preferred care methods for different plants. The expert system can especially advantageously establish preferred sprinkling times and sprinkling quantities on the basis of this information. The zone server can coordinate activities of other garden devices and/or of the user and/or prevent conflicts between sprinkling and activities of other garden devices and/or of the user. The zone server can be part of the programming system and/or have functions that are part of the programming system. In particular, zone maps and/or sprinkling zones can be stored on the zone server. The programming system can have especially advantageous information for establishing sprinkling areas and/or sprinkling times and/or sprinkling quantities. The zone server can use information from other garden devices to establish sprinkling zones and/or sprinkling areas. In particular, a mower robot can have the function of automatically detecting a mowing zone. The mowing robot can transmit the geometric data for the identified mowing zone to the zone server, and the zone server can establish a sprinkling zone and/or one or more sprinkling areas on the basis of the geometric data. The programming system can make information available to the zone server. Information of the programming system can be linked by the zone server to information of other garden devices and/or made available especially easily to the user, particularly in an internet-based manner, Advantageously, the zone server can have a sprinkler database in which the technical data of different sprinklers and/or sprinkler positions are stored. The zone server can advantageously convert geometric data from absolute coordinates that are independent of a sprinkler model and/or a sprinkler position to coordinates that are adapted to sprinkler model and sprinkler position. The zone server can determine preferred sprinkler positions for the irrigation of the sprinkling zones in consideration of the possible sprinkling areas of the sprinklers.

According to the invention, the programming system is provided for the purpose of transforming geometric data of the zone map into sprinkling control parameters of the control device of the sprinkler. The sprinkling control parameters can particularly be represented in relative coordinates of the respective sprinkler. "Geometric data" is to be understood in this context particularly as boundaries of sprinkling zones and/or sprinkling areas. In particular, the geometric data can be present in absolute coordinates that are independent of sprinkler models and/or sprinkler positions. The programming system can transform the geometric data into relative coordinates of the respective sprinklers that are dependent on the sprinkler model and sprinkler position and convey them to the sprinklers. The programming system can be used with great flexibility with different sprinkler models and sprinkler positions. The programming system can have a learning mode whose purpose it is to determine and/or learn parameters of the sprinkler. In particular, a stream range can be dependent on a setting of a control valve of the sprinkler. In learning mode, the stream range can be measured at different settings of the control valve and stored with the programming system, particularly by the programming unit. The programming system can advantageously determine the sprinkling control parameters automatically with the aid of geometric data. Learning of the sprinkling control parameters for irrigating a sprinkling zone and/or a sprinkling area can be omitted. Particularly, in the case of a change in the sprinkler position, or if a sprinkler is exchanged for a sprinkler having a different design, the programming system can determine appropriate sprinkling control parameters. The sprinkling control system can be especially flexible.

Especially advantageously, the programming system is provided for the purpose of removing at least one protected zone from sprinkling zones and/or the sprinkling area. In this context, a "protected zone" is to be understood as a zone that is to be excluded from sprinkling. Preferably, in the case of overlapping zones, protected zones take precedence over sprinkling zones. A protected zone can be defined as permanent, temporary and/or dynamic. A permanent protected zone can be an area within a sprinkling zone that is to be excluded from sprinkling, for example a path leading through the sprinkling zone. A temporary protected zone can be a protected zone set up for a period of time, for example a zone in the sprinkling zone in which one or more people and/or users are present in that period of time. A dynamic protected zone can be a zone that changes in location.

In particular, a zone around a user who is moving in the sprinkling zone can be excluded from the sprinkling. Preferably, the user has a device that transmits their current position to the programming system, particularly to the zone server, such as a smartphone, a smart watch, or a smart glass that has a positioning function. The user can also carry a chip and/or tag that conveys information to the programming system. Particularly, the chip and/or tag can be used to determine and/or convey the location of the user. The protected zone can be defined by a circle around the user's current position. The protected zone is excluded from sprinkling. Undesired sprinkling of the user and/or of other people can be avoided.

Moreover, it is proposed that the programming system be provided in at least one operating mode in order to enable a user to control the sprinkler directly. In this context, "direct control" is particularly intended to be understood as meaning that the user can directly determine the sprinkling control parameters of the sprinkler, for example settings of control valves and orientations of nozzles. Preferably, the programming device can have at least one operating mode that is provided so as to enable the user to control the sprinkler directly. The user can advantageously sprinkle the zones with the aid of the sprinkler.

Preferably, the programming device can be provided in at least one operating mode for the purpose of enabling the user to control the sprinkler directly in order to establish sprinkling areas of the sprinkler. The user can irrigate the sprinkling area to be sprinkled by the sprinkler by controlling the sprinkler directly by setting the sprinkling control parameters manually such that sprinkling of the sprinkling area occurs. Preferably, input means are provided with which the user can store sprinkling control parameters. Preferably, the programming device can have these input means; particularly it can display them on its touchscreen. By changing the sprinkling control parameters, the user can move the liquid streams in the sprinkling area until the sprinkling area has been completely irrigated. The programming system can store the succession of sprinkling control parameters required to irrigate the sprinkling area either automatically or through input of the user. Consequently, sprinkling areas established in this way can be used for automatic irrigation controlled by the programming system. In particular, the programming system can convert the learned sprinkling control parameters from relative to absolute coordinates and store the sprinkling area with the aid of the zone map server. The sprinkling areas established by directly controlling the sprinkler can advantageously be used for irrigation by sprinklers having a different sprinkler position and/or a different sprinkler type.

Moreover, it is proposed that the programming system be provided for the purpose of determining sprinkling control parameters for a rotary sprinkler having a nozzle arrangement that can be rotated by the control device of the sprinkler about a vertical axis and an adjustable stream range, and/or determining sprinkling control parameters for an oscillating sprinkler having a nozzle arrangement that can be rotated about a horizontal axis. Preferably, the control device can have at least one control valve and at least one drive. A rotary sprinkler can be particularly suitable for sprinkling a sprinkling zone defined by the zone map. Particularly, a contour of the sprinkling area of the sprinkler can be adapted to the sprinkling zone by appropriately changing the sprinkling control parameters of the rotary sprinkler. An oscillating sprinkler can be especially cost-effective. An oscillating sprinkler can irrigate an at least substantially rectangular sprinkling area in an especially efficient and/or economical manner.

It is particularly proposed that the sprinkling control parameters for the rotary sprinkler comprise at least one stream range vector and/or angle vector and/or dwell time vector and/or that the sprinkling control parameters for the oscillating sprinkler comprise at least one swivel angle vector and/or dwell time vector. In this context, a "stream range vector" is intended to refer particularly to a vector containing a succession of stream ranges and/or settings of the control valve of the sprinkler corresponding to stream ranges. An "angle vector" is to be understood in this context particularly as a vector containing a succession of angular positions of the nozzle arrangement of the sprinkler, particularly angular positions about the vertical axis. A "Dwell time vector" is to be understood in this context particularly as a vector containing a succession of dwell times at which the sprinkler is to remain set with the respective actuating variables of the segment and/or angle vectors until a transition to the next actuating variables occurs, and/or containing a succession of speeds at which the sprinkling control parameters of the sprinkler are to be changed. The sprinkling control parameters can be particularly well suited for controlling a rotary sprinkler. A "swivel angle vector" is to be understood in this context particularly as a vector containing a succession of angular positions of the swivelable nozzle arrangement of the oscillating sprinkler about the horizontal axis. A width of the sprinkling area perpendicular to the horizontal axis can advantageously be adjusted. Preferably, the sprinkling control parameters for the oscillating sprinkler can additionally comprise an opening angle range of the liquid streams emerging from the nozzle arrangement as measured in relation to the horizontal axis. A length of the sprinkling area in the direction of the horizontal axis can advantageously be adjusted.

Preferably, the control unit and/or the programming unit can be provided for the purpose of interpolating intermediate values of the vectors. The precision of the sprinkling can be improved.

Alternatively to the use of vectors, the sprinkling control parameters can also be represented as a function of time. This is advantageous particularly if the profile of the sprinkling control parameters can be described as a function of time.

Moreover, a sprinkler device with at least one sprinkler and one sprinkling control system is proposed. Particularly, the sprinkler can have the programming unit and suitable interfaces for communicating with other components of the programming system of the sprinkling control system. The sprinkler device can be used in an especially flexible manner for the irrigation of sprinkling zones.

Moreover, a method is proposed for establishing a sprinkling area and/or sprinkling zone with a sprinkling control system. The establishing of sprinkling areas and/or sprinkling zones can be especially comfortable. Data from sprinkling areas can be used to sprinkle sprinkling zones with different sprinkler models. The sprinkling control system according to the invention is not intended to be limited to the application and embodiment described above. In particular, to implement a functionality described herein, the sprinkling control system according to the invention can have a number of individual elements, components and units that differs from a number named herein.

DRAWINGS

Additional advantages follow from the following description of the drawing. One exemplary embodiment of the invention is illustrated in the drawings. The drawings, the description and the claims contain numerous features in combination. A person skilled in the art will also view the features individually as proves expedient and group them together into other sensible combinations.

DESCRIPTION OF THE EXEMPLARY EMBODIMENT

Figure 1:
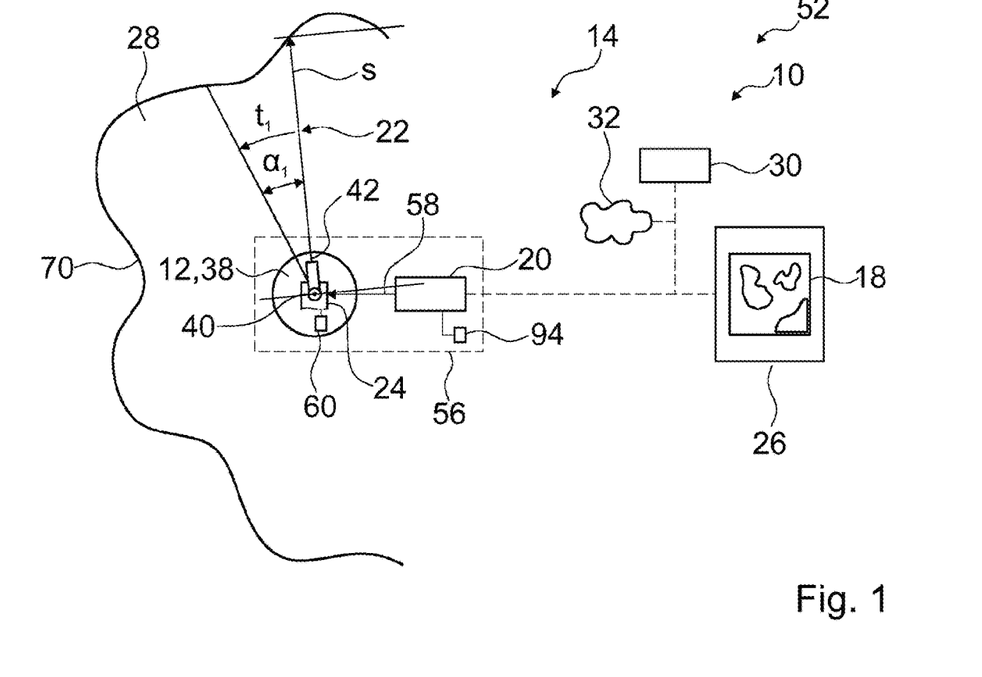
FIG. 1 shows a schematic representation of a sprinkling control system for controlling a sprinkler, with a sprinkling area and with a programming unit and a programming device.

FIG. 1 shows a schematic representation of a section of a garden 51 with a sprinkling control system 10 for controlling sprinklers 12 arranged at sprinkler positions in the garden, with a programming system 14 that is provided for the purpose of establishing a sprinkling area 16 of the sprinkler 12 with the aid of a zone map 18.

The programming system 14 has a programming unit 20 that is provided for the purpose of conveying sprinkling control parameters 22 to a control device 24 of the sprinkler 12. The programming unit 20 is arranged with the sprinkler 12 in a common housing unit 56 and has a data link 58 for conveying the sprinkling control parameters 22 to the control device 24 of the sprinkler 12. The control device 24 contains a memory unit 60 for storing the sprinkling control parameters 22 of a sprinkling operation. Moreover, the programming unit 20 has a parameter memory 94 for storing sprinkling control parameters 22 and/or geometric data.

Figure 2:
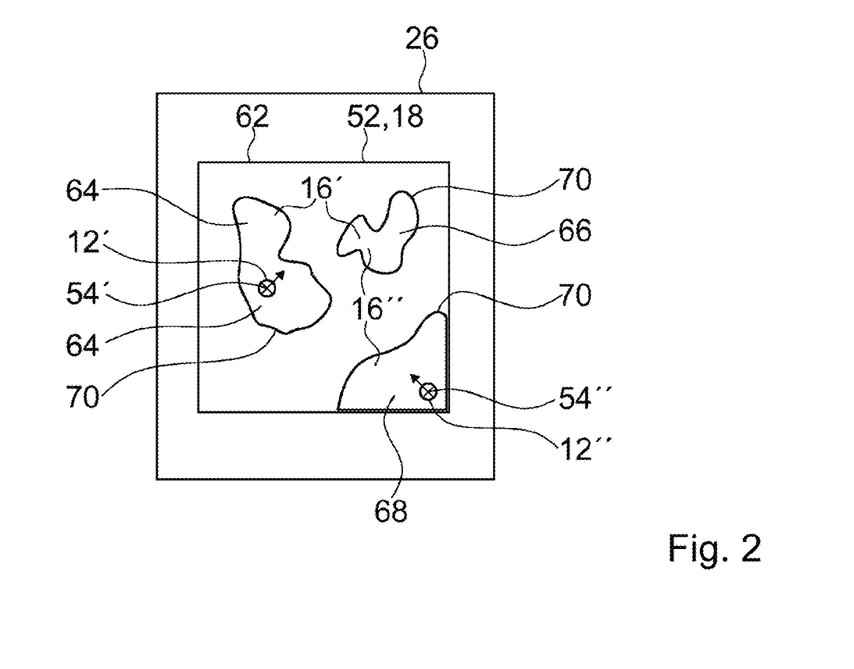
FIG. 2 shows a schematic representation of the programming device, with a zone map with sprinkling zones.

Moreover, the programming system 14 has a programming device 26 embodied as a tablet computer with programming software for defining geometric data contained in sprinkling zones 28 and sprinkling areas 16 of the sprinkler 12. The programming device 26 is linked to the programming unit 20 via a wireless internet connection. FIG. 2 shows a representation of a screen 62 of the programming device 26. The screen 62 embodied as a touch-sensitive touchscreen for user input shows the zone map 18 of the garden 52. Contours 70 of three zones 64, 66, 68 are drawn in the zone map 18. The zones 64, 66, 68 are sprinkling zones 28. A desired irrigation quantity is assigned to each of the zones 64, 66, 68 and stored by the programming system 14 with the contours 70 of the zones 64, 66, 68. A first sprinkler 12' is arranged in the zone 64 at the sprinkler position 54', and a second sprinkler 12" is arranged in the zone 68 at the sprinkler position 54". The sprinkler positions 54 each contain the location and orientation of the sprinklers 12. The zone 66 is irrigated by the sprinklers 12' and 12" from the zones 64 and 68.

The contours 70 of the zones 64, 66, 68 and the sprinkler positions 54 can be drawn by the user on the screen 62. For this purpose, the programming device 26 loads a map of the zone containing the garden 52 from server on the internet so that the map can be added to the zone map 18 of the garden 52. The programming device 26 also has positioning means and a camera (not shown in further detail here). In an alternative operating mode, the user can run over the contours 70 of the zones 64, 66, 68 with the programming device 26. The programming device 26 detects the passed-over contours 70 with the aid of the positioning means. In addition, zone boundaries can be detected by the programming device 26 with the aid of camera images. The determination of the sprinkling zones 28 can thus be supported by the programming device 26.

The sprinkling areas 16' and 16" of the sprinklers 12' and 12" are established by the programming device 26 such that they cover the sprinkling zones 28. The zone 66 is provided for especially intensive irrigation and is covered by the sprinkling areas 16' and 16" of both sprinklers 12' and 12".

The programming system 14 also has a zone server 30 linked to the programming unit 20 and the programming device 26. The zone server 30 is used to store zone maps 18, sprinkling areas 16, sprinkling zones 28, sprinkler positions 54 and other data of the sprinkling control system 10. In addition, the zone server 30 is us part of other garden control systems (not shown here) and coordinates the use thereof. Furthermore, the zone server 30 retrieves data from external information systems 32, particularly a weather report. These data can be used by the sprinkling control system 10 to plan sprinkling operations. Moreover, the zone server 30 coordinates the programming units 20 of the sprinklers 12 as well as the allocation of the sprinkling areas 16 and sprinklers 12 to the sprinkling zones 28, particularly when the programming device 26 is not available. The programming device 26 therefore need only be used when the zone map data are to be modified with the programming device 26.

The programming system 14 is provided for the purpose of transforming the geometric data of the zone map 18 with the contours 70 of the sprinkling zones 28 into the sprinkling control parameters 22 of the control devices 24 of the sprinklers 12' and 12". The sprinklers 12 are embodied as rotary sprinklers 38. The rotary sprinklers 38 have a nozzle arrangement 42 with an adjustable stream range s that can be rotated by the control devices 24 of the sprinklers 12 about a vertical axis 40 by an angle α. The programming unit 20 calculates the sprinkling control parameters 22 that are suitable for the sprinkler 12 from the contours 70 of the sprinkling zones 28 that are provided for sprinkling by the respective sprinklers 12, so that the streams of the sprinkler 12 sprinkle the area enclosed by the contour 70 of the sprinkling zone 28.

Figure 3:
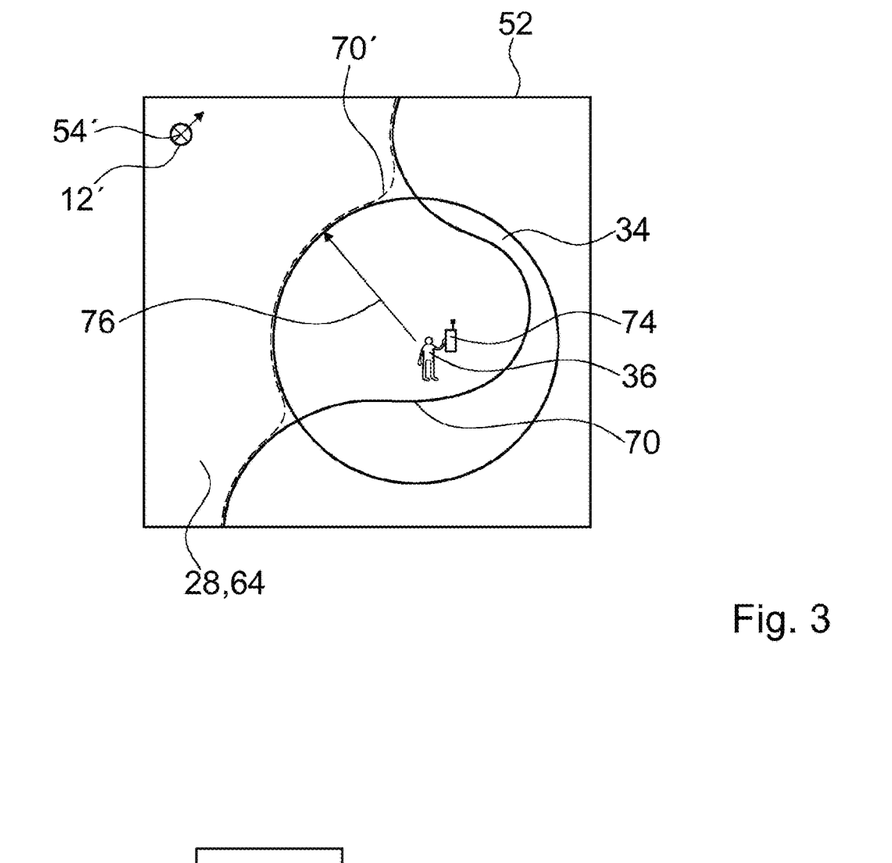
FIG. 3 shows a schematic representation of a sprinkling zone and of a protected zone.

FIG. 3 shows a section of the zone map 18. A user 36 is crossing the zone 64 embodied as a sprinkling zone 28. The user 36 is carrying a smartphone 74 that has a positioning function and is linked to the programming system 14 via a wireless internet connection. Alternatively, the user 74 can receive the message using a smart watch or a smart glass or a similar suitable device. A protected zone 34 with a protection radius 76 is provided around the user 36. The smartphone 74 transmits a current position of the user 36 to the zone server 30 of the programming system 14.

The zone server 30 excludes the protected zone 34 from the sprinkling zones 28 and conveys the sprinkling zones 28 and sprinkling areas 16 altered in this way to the programming units 20 of the sprinklers 12. The contour 70 of the zone 64 is modified into a new contour 70', whereby the protected zone 34 around the user 36 is excluded from the sprinkling. As the user 36 moves around the garden 52, the position of the protected zone 34 is updated dynamically with the aid of the respective position of the user 36 transmitted from the smartphone 74. Likewise, a domestic animal having a GPS collar or similar device can also be a user 74. The programming system 14 can identify the location of the domestic animal, and sprinkling areas 16 can be modified in the described manner so as not to sprinkle on the domestic animal.

Figure 4:
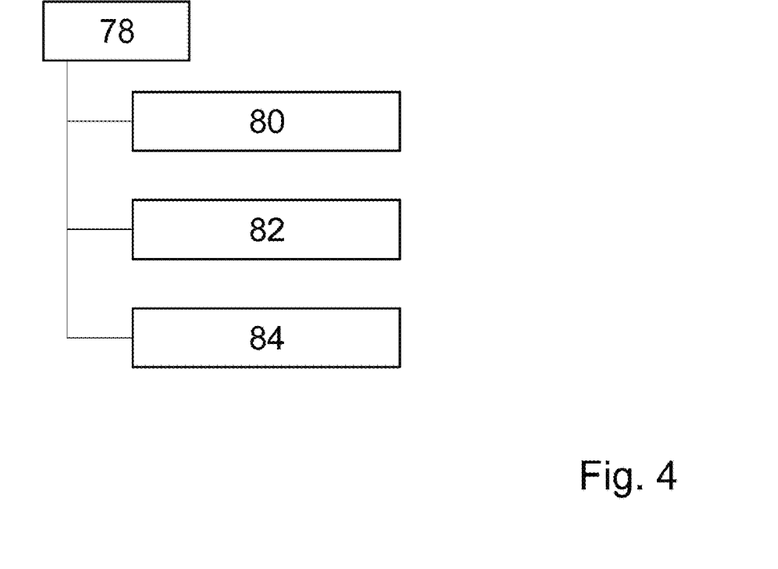
FIG. 4 shows a schematic representation of operating modes of the sprinkling control system.

FIG. 4 shows possible operating modes 78 of the sprinkling control system 10. In an independent operation 80, the sprinklers 12 automatically carry out the irrigation of the sprinkling zones 28.

The sprinkler control parameters 20 determined by the programming units 20 are stored on the memory units 60 of the control devices 24 of the sprinklers 12 and are executed according to an established schedule.

User-controlled operation 82 is provided in order to enable the user 36 to control the sprinklers 12 directly. The user 36 conveys sprinkling control parameters 22 with the aid of the programming device 26 directly to the programming unit 20 and can thus control the sprinklers 12 himself as needed. The sprinkling control parameters 22 conveyed by the user 36 to the programming unit 20 are additionally stored by the programming unit 20 and transmitted to the zone server 30 and stored. In this operating mode, the programming system 14 is provided for the purpose of establishing sprinkling areas 16 of the sprinkler 12 through direct controlling of the sprinkler 12 by the user 36. The zone server 30 determines the sprinkling area 16 irrigated by the sprinkler 12 from the sprinkling control parameters 22. The programming unit 20 can use the stored sprinkling control parameters 22 in order to sprinkle the sprinkling area 16 automatically in the future in the independent mode. The zone server 30 can use the sprinkling area 16 determined from the sprinkling control parameters 22 in order to automatically control the irrigation of this sprinkling area 16 in the future. In particular, the zone server 30 can generate sprinkling control parameters 22 for other types of sprinklers 12 starting from the determined sprinkling area 16.

System operation 84 coordinated by the zone server 30 is provided for operation of a system of several sprinklers 12 and, if present, other garden devices. The zone server 30 administrates the sprinkling zones 28 and determines optimum sprinkling times and sprinkling quantities. The zone server 30 allocates sprinklers 12 to the sprinkling zones 28, determines the sprinkling areas 16 of the sprinklers 12 and conveys them to the programming unit 20 of the sprinklers 12. The programming units 20 calculate the sprinkling control parameters 22 of the sprinklers 12 from the data of the zone server 30 and convey them to the control devices 24 of the sprinklers 12.

Figure 5:
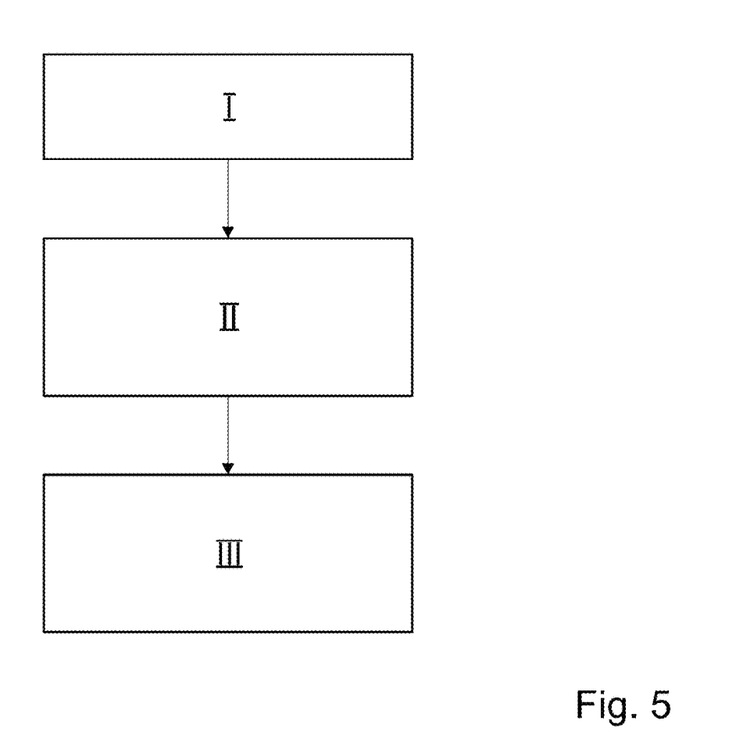
FIG. 5 shows a schematic representation of a procedure for the programming of a sprinkling area of the sprinkler using the sprinkling control system.

FIG. 5 shows a procedure for programming sprinkling zones 28. In a step I, the sprinkling zones 28 are defined with the programming device 26. In a step II, the sprinkler positions 54 are detected with location and orientation. The sprinklers 12 can have means for detecting their position and their orientation, such as GPS receivers, a compass, and/or a laser range finder, thus enabling automatic detection of the sprinkler positions 54. The determination of the sprinkler positions 54 can also be done by the programming device 26. Advantageously, as shown in a sprinkler 12 embodied as an oscillating sprinkler 86 in FIG. 10, the sprinklers 12 have a recess 88 into which the programming device 26 can be placed in order to determine the sprinkler position 54 and orientation defined in relation to the sprinkler 12. In a step III, geometric data and other data are calculated for the irrigation of the sprinkling areas 16 and subsequently transmitted to the programming units 20. Step III can be carried out by the programming device 26 or by the zone server 30. Once the geometric data have been calculated by the zone server 30, the programming device 26 transmits the data on the sprinkling zones 28 and the sprinkler positions 54 to the zone server 30, which calculates the geometric data and other data for irrigating the sprinkling areas 16 and transmits them to the programming units 20.

Figure 6:
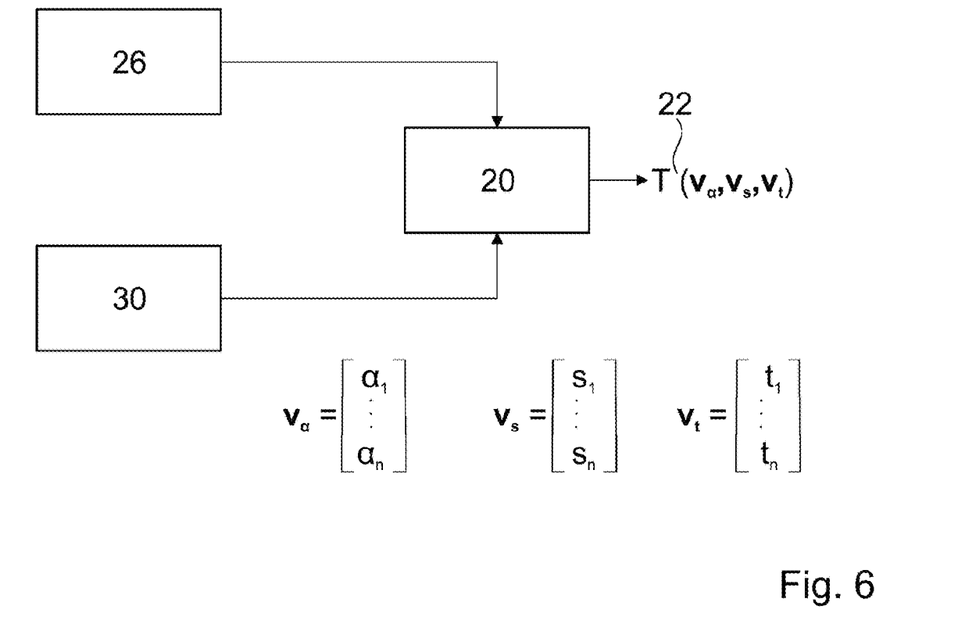
FIG. 6 shows a schematic representation of the determination of sprinkling control parameters.
Figure 7:
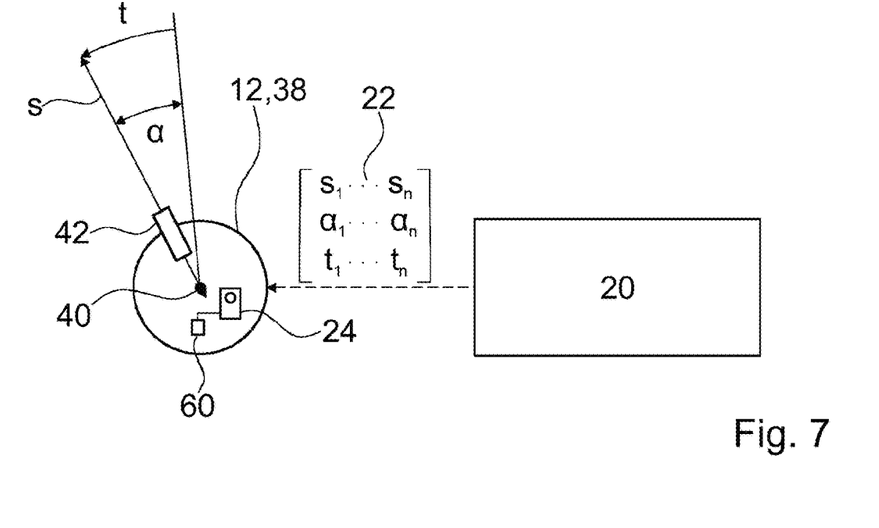
FIG. 7 shows a schematic representation of sprinkling control parameters in a sprinkler embodied as a rotary sprinkler.

FIG. 6 shows a block diagram of the generation of the sprinkling control parameters 22 of the sprinkling control system 10 using the example of a sprinkler 12 that is embodied as a rotary sprinkler 38. The programming device 26 determines the sprinkling control parameters 22 for the sprinkler 12 on the basis of the geometric data of the sprinkling zones 28 and/or sprinkling areas 16 and the sprinkler position 54 of the sprinkler 12 and conveys them in relative coordinates to the programming unit 20. In another operating mode, this task can be carried out by the zone server 30. The zone server 30 coordinates the use of the sprinklers 12 on the basis of, among other things, a weather report and gives the programming unit 20 a command to start a sprinkling operation. The programming unit 20 forwards the sprinkling control parameters 22 of the sprinkler 12 to the control devices 24 of the sprinkler 12 (FIG. 7). The sprinkling control parameters 22 comprise a sprinkling control matrix T with a stream range vector $v_s$, an angle vector $v_\alpha$ and a dwell time vector $v_t$, with which the rotary sprinklers 38 are controlled, so that they irrigate the sprinkling zones 28. In an alternative embodiment, the programming device 26 or the zone server 30 transmits geometric data of the sprinkling area 16 to be irrigated by the sprinkler 12 to the programming unit 20 in absolute coordinates. The programming unit 20 determines the sprinkling control parameters 22 from the geometric data and the sprinkler position 54.

Figure 8:
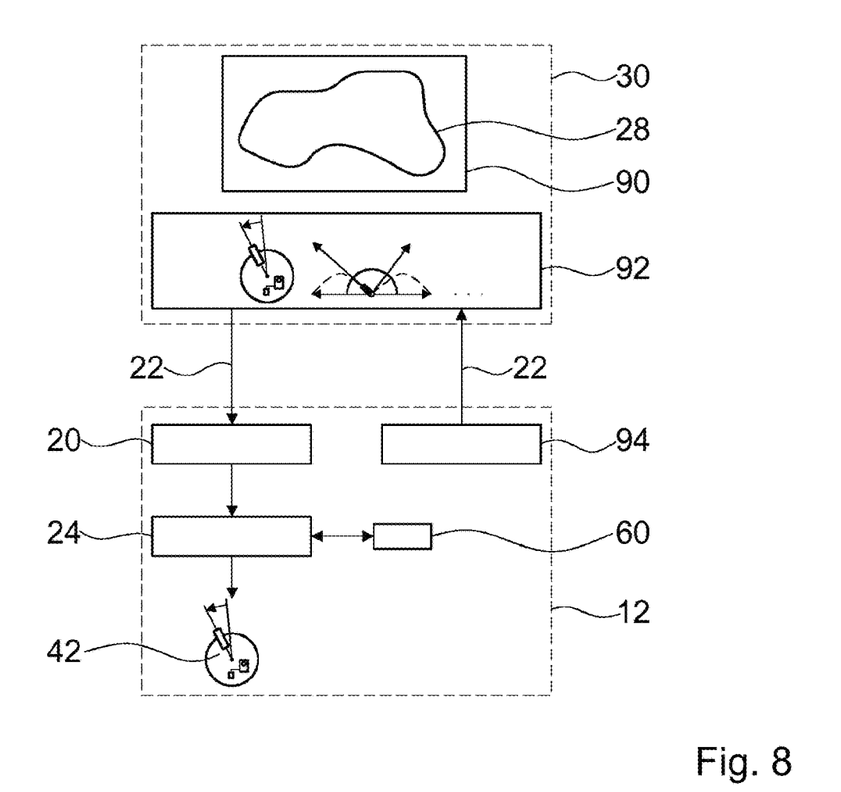
FIG. 8 shows a schematic representation of a data flow of the programming system.

FIG. 8 shows a schematic representation of a data flow of the programming system 14 for calculating the sprinkling control parameters 22. Depending on the operating mode, this calculation can be carried out by the programming device 26, the zone server 30 or the programming unit 20. In a data model 90, sprinkling zones 28 are stored in absolute coordinates.

A sprinkler model 92 contains a description of sprinklers 12, for example of the rotary sprinkler 28 or of the oscillating sprinkler 86. With the aid of the sprinkler model 92, the sprinkling control parameters 22 are calculated for the sprinkler 12 and forwarded to the programming unit 20. The programming unit 20 forwards them to the control device 24, thus controlling the sprinkler 12. The programming unit 20 has a parameter memory 94 for storing the sprinkling control parameters 22. For example, in user-controlled operation 82, the sprinkling control parameters 22 can also be generated directly by the user 36 and conveyed to the programming unit 20. The programming unit 20 stores them in the parameter memory 94 and transmits them to the sprinkler model 92. With the aid of the sprinkler model 92, the sprinkling area 16 is converted into absolute coordinates and integrated into the data model 90 of the sprinkling zones 28. In the depicted example, the data model 90 and the sprinkler model 92 are part of the zone server 30 that performs the calculation of the sprinkling control parameters 22.

Figure 9:
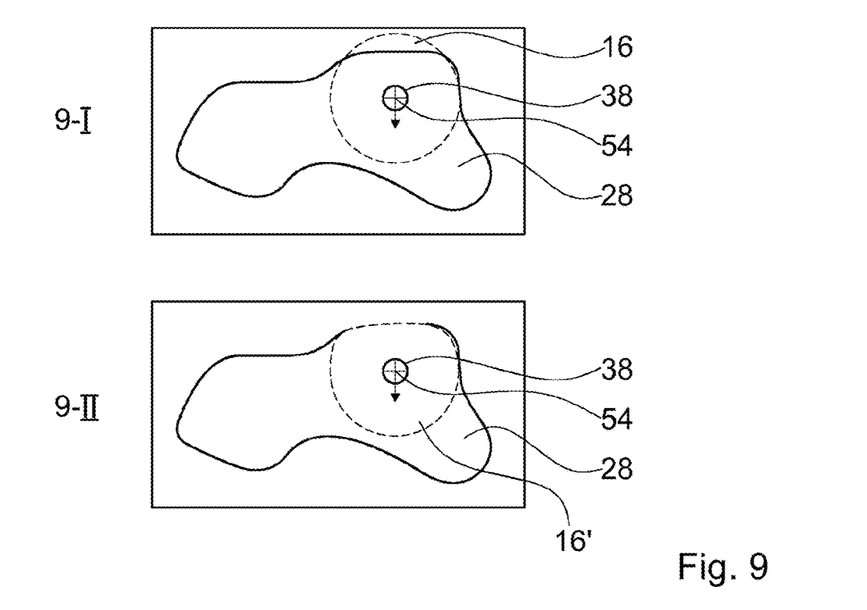
FIG. 9 shows a schematic representation of the establishment of the sprinkling area in a sprinkling zone with the rotary sprinkler.

FIG. 9 shows the establishment of the sprinkling area 16 in a sprinkling zone 28 with the rotary sprinkler 38. FIG. 9-I shows the maximum sprinkling area 16 of the rotary sprinkler 38 in its current sprinkler position 54 and the sprinkling zone 28. FIG. 9-II shows the intersection of the maximum sprinkling area 16 and the sprinkling zone 28. The sprinkling control parameters 22 are set such that the rotary sprinkler 38 irrigates the sprinkling area 16' corresponding to the intersection and shown in FIG. 9-II. In order to irrigate the remaining portion of the sprinkling zone 28, additional sprinklers 12 are required. Alternatively, the sprinkler position 54 of the rotary sprinkler 38 can be changed and another sprinkling operation can be carried out until the entire sprinkling zone 28 has been irrigated.

Figure 10:
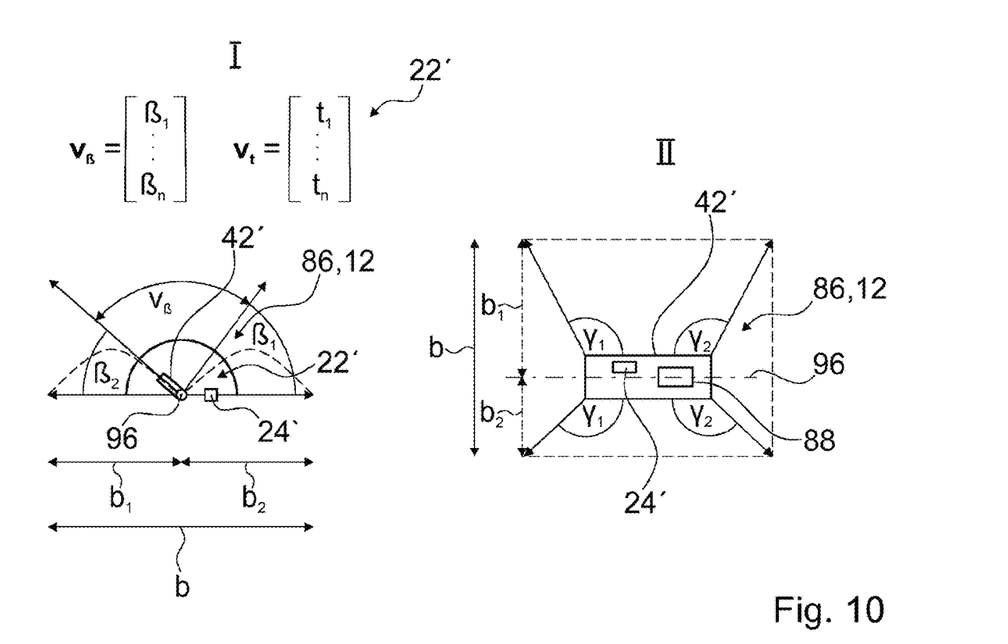
FIG. 10 shows a schematic representation of an oscillating sprinkler and of sprinkling control parameters of the oscillating sprinkler.

FIG. 10 shows a schematic representation of the sprinkler 12 embodied as an oscillating sprinkler 86 in a side view (FIG. 10-I) and a top view (FIG. 10-II) as well as sprinkling control parameters 22' of the oscillating sprinkler 86. Depending on the desired sprinkling areas 16, the use of a rotary sprinkler 38 or of an oscillating sprinkler 86 can be advantageous. The oscillating sprinkler 86 has a nozzle arrangement 42' that can be swiveled about a horizontal axis 96. A sprinkling width b can be determined by establishing a swivel angle β of the nozzle arrangement 42' about the axis 96 from an angle $β_1$ to an angle $β_2$, each measured from the horizontal (FIG. 9-I). A sprinkling length a can be determined through the opening angle $γ_1$ and $γ_2$ of the liquid streams emerging from the nozzle arrangement 42' measured with respect to the horizontal axis 96 (FIG. 10-II). If all of the parameters $β_1$, $β_2$, $γ_1$ and $γ_2$ can be adjusted in the oscillating sprinkler 86 by means of a control device 24', the sprinkling control parameters 22' for the oscillating sprinkler 86 have a succession of swivel angles β from $β_1$ to $β_2$ and of opening angles γ from $γ_1$ to $γ_2$ over a dwell time t. In the depicted example, the parameters $γ_1$ and $γ_2$ are set in a fixed manner on the oscillating sprinkler 86, so that the sprinkling control parameters 22' comprise a swivel angle vector $v_β$ and the dwell time vector $v_t$. The oscillating sprinkler 86 shown here also has the recess 88 into which the programming device 26 can be inserted to determine the sprinkler position 54. This recess 88 can also be provided on other sprinklers 12, such as rotary sprinklers 38, for example.

Figure 11:
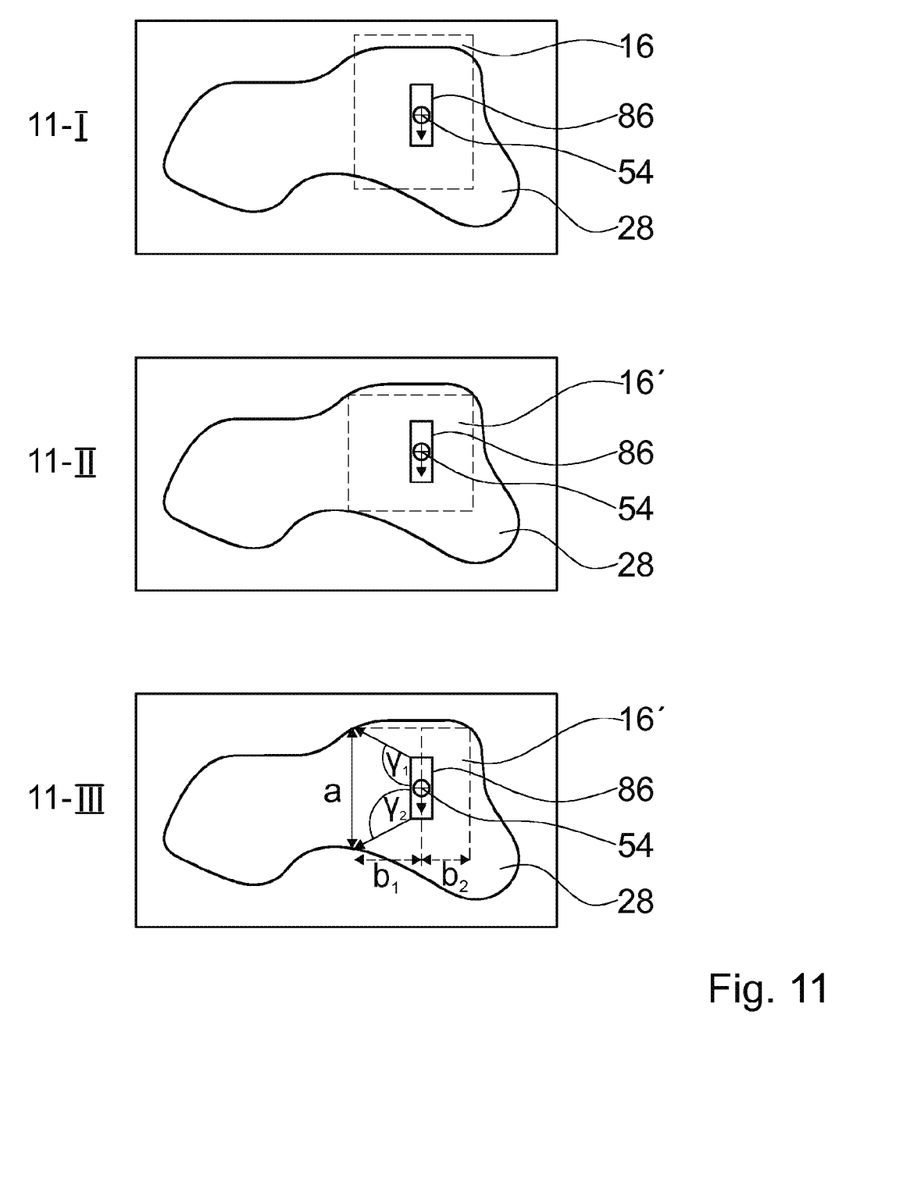
FIG. 11 shows a schematic representation of the establishment of the sprinkling area in a sprinkling zone with the oscillating sprinkler.

FIG. 11 shows the establishment of the sprinkling area 16 and the associated sprinkling control parameters 22' in a sprinkling zone 28 in the oscillating sprinkler 86. The maximum sprinkling area 16 of the oscillating sprinkler 86 is rectangular and shown in the current sprinkler position 54 in FIG. 11-I. The sprinkling control parameters 22 are set such that the oscillating sprinkler 86 irrigates the sprinkling area 16' corresponding to the intersection and shown in FIG. 11-II. To determine sprinkling control parameters 22' in which the oscillating sprinkler 86 irrigates a sprinkling area 16' corresponding to the intersection, the sprinkling length a is measured and the angles $γ_1$ and $γ_2$ are established therewith (FIG. 11-III). Moreover, the sprinkling width b is measured starting from the axis 96 subdivided into $b_1$ and $b_2$ in order to determine the swivel range $γ_1$ to $γ_2$ of the swivel angle γ. By varying the swivel angle γ over the dwell time t, the sprinkling area 16' is irrigated. The dwell time vector $v_t$ determines the speed at which the swivel angle γ is changed.

REFERENCE SYMBOLS 10 sprinkling control system
12 sprinkler
14 programming system
16 sprinkling area
18 zone map
20 programming system
22 sprinkling control parameter
24 control device
26 programming device
28 sprinkling zone
30 zone server
32 Information system
34 protected zone
36 user
38 rotary sprinkler
40 axis
42 nozzle arrangement
52 garden
54 sprinkler position
56 housing unit
58 data link
60 memory unit
62 screen
64 zone (first)
66 zone (second)
68 zone (third)
70 contour
74 smartphone
76 protected radius
78 operating mode
80 independent operation
82 user-controlled operation
84 system operation
86 oscillating sprinkler
88 recess
90 data model
92 sprinkler model
94 parameter memory
96 axis
$v_s$ stream range vector
$v_α$ angle vector
$v_t$ dwell time vector
$v_β$ swivel angle vector
T sprinkling control matrix
s stream range
t time
α angle
β swivel angle
γ opening angle
b sprinkling width
a sprinkling length

The invention claimed is:

1. A sprinkling control system for controlling a sprinkler, the sprinkling control system comprising:
a programming system configured to determine at least one sprinkling area of the sprinkler based on a zone map and transform geometric data of the zone map into sprinkling control parameters for a control device of the sprinkler, the geometric data being determined by superordinate components independently of sprinkler design,
wherein transforming geometric data of the zone map comprises converting absolute coordinates of a selected area of the zone map that are independent of a model or a position of the sprinkler into relative coordinates specific to the model and the position of the sprinkler.

2. The sprinkling control system as set forth in claim 1, wherein the programming system comprises a programming unit, the programming unit being configured to convey the sprinkling control parameters to the control device of the sprinkler.

3. The sprinkling control system as set forth in claim 2, wherein the programming system further comprises a programming device, the programming device being configured to define the geometric data of the zone map.

4. The sprinkling control system as set forth in claim 3, wherein the programming system further comprises a zone server linked to the programming unit or the programming device in at least one operating state, the zone server being configured to store the at least one sprinkling area, the zone map, the geometric data of the zone map, or the sprinkling control parameters.

5. The sprinkling control system as set forth in claim 3, wherein the programming system is configured to exclude at least one protected zone from the at least one sprinkling area.

6. The sprinkling control system as set forth in claim 3, wherein the programming system is further configured to operate in a plurality of operating modes, wherein at least one of the plurality of operating modes enables a user to override the sprinkling control parameters determined by the programming system and control the sprinkler directly.

7. The sprinkling control system as set forth in claim 6, wherein in the at least one of the plurality of operating modes that enables the user to control the sprinkler directly, the programming system enables the user to override the at least one sprinkling area determined by the programming system and establish the at least one sprinkling area.

8. The sprinkling control system as set forth in claim 3, wherein the sprinkler is either a rotary sprinkler having a nozzle arrangement that is configured to have an adjustable stream range and be rotated about a vertical axis or an oscillating sprinkler having a nozzle arrangement configured to be rotated about a horizontal axis.

9. The sprinkling control system as set forth in claim 8, wherein the sprinkling control parameters for the rotary sprinkler comprise at least one stream range vector, at least one angle vector, or at least one dwell time vector, and wherein the sprinkling control parameters for the oscillating sprinkler comprise at least one swivel angle vector or at least one dwell time vector.

10. A sprinkler device with at least one sprinkler and a sprinkling control system, the sprinkling control system comprising:
    a programming system configured to determine at least one sprinkling area of the sprinkler based on a zone map and transform geometric data of the zone map into sprinkling control parameters for a control device of the sprinkler, the geometric data being determined by superordinate components independently of sprinkler design,
    wherein transforming geometric data of the zone map comprises converting absolute coordinates of a selected area of the zone map that are independent of a model or a position of the at least one sprinkler into relative coordinates specific to the model and the position of the at least one sprinkler.

11. A method for establishing a sprinkling area or a sprinkling zone for a sprinkler with a sprinkling control system, the sprinkling control system comprising a programming system, the method comprising:
    transforming, via the programming system, geometric data of a zone map into sprinkling control parameters for a control device of the sprinkling control system, the geometric data being determined by superordinate components independent of sprinkler design, wherein transforming, via the programming system, geometric data of the zone map comprises converting absolute coordinates of a selected area of the zone map that are independent of a model or a position of the sprinkler into relative coordinates specific to the model and the position of the sprinkler without user interaction; and
    determining, via the programming system, at least one sprinkling area of the sprinkler based on the zone map.

12. The sprinkler device of claim 10, wherein the programming system comprises a programming unit, the programming unit being configured to convey the sprinkling control parameters to the control device of the sprinkler.

13. The sprinkler device of claim 12, wherein the programming system further comprises a programming device, the programming device being configured to define the geometric data of the zone map.

14. The sprinkler device of claim 13, wherein the programming system further comprises a zone server linked to the programming unit or the programming device in at least one operating state, the zone server being configured to store the at least one sprinkling area, the zone map, the geometric data of the zone map, or the sprinkling control parameters.

15. The sprinkler device of claim 13, wherein the programming system is configured to exclude at least one protected zone from the at least one sprinkling area.

16. The sprinkler device of claim 13, wherein the programming system is further configured to operate in a plurality of operating modes, wherein at least one of the plurality of operating modes enables a user to override the sprinkling control parameters determined by the programming system and control the sprinkler directly.

17. The sprinkler device of claim 16, wherein in the at least one of the plurality of operating modes that enables the user to control the sprinkler directly, the programming system enables the user to override the at least one sprinkling area determined by the programming system and establish the at least one sprinkling area.

18. The method of claim 11 further comprising conveying the sprinkling control parameters to the control device of the sprinkler via a programming unit of the programming system.

19. The method of claim 11, wherein the sprinkling control parameters comprise a sprinkling control matrix having a stream range vector, an angle vector, and a dwell time vector.

* * * * *